United States Patent [19]

Yoshida et al.

[11] Patent Number: 5,135,154
[45] Date of Patent: Aug. 4, 1992

[54] REUSABLE STUD WELDING FERRULE CONTAINING BORON NITRIDE

[75] Inventors: Mikihiko Yoshida, Ibaragi; Hiroaki Yamada, Saitama, both of Japan

[73] Assignee: Okabe Co., Ltd., Tokyo, Japan

[21] Appl. No.: 610,959

[22] Filed: Nov. 9, 1990

[30] Foreign Application Priority Data

Nov. 13, 1989 [JP] Japan .................. 1-294338

[51] Int. Cl.⁵ .............................................. B23K 9/20
[52] U.S. Cl. ........................................ 228/46; 228/216;
219/99
[58] Field of Search ............... 219/99; 16/108, 109;
501/96, 97; 228/216, 19, 50, 46

[56] References Cited

U.S. PATENT DOCUMENTS

| | | | |
|---|---|---|---|
| 2,776,218 | 1/1957 | Taylor | 501/96 |
| 3,557,339 | 1/1971 | Rondeau | 219/99 |
| 3,597,573 | 8/1971 | Ettinger | 219/99 |
| 3,673,676 | 7/1972 | Lock et al. | 228/176 |
| 4,666,873 | 5/1987 | Morris, Jr. et al. | 501/96 |
| 4,764,489 | 8/1988 | Bolt | 501/96 |
| 4,904,625 | 2/1990 | Shaffer | 501/96 |
| 4,946,809 | 8/1990 | Paciorek et al. | 501/96 |

FOREIGN PATENT DOCUMENTS

| | | | |
|---|---|---|---|
| 56-26771 | 3/1981 | Japan | 501/97 |
| 56-26772 | 3/1981 | Japan | 501/97 |
| 59-141379 | 8/1984 | Japan . | |
| 60-181269 | 12/1985 | Japan . | |
| 784704 | 10/1957 | United Kingdom | 501/96 |
| 1376891 | 12/1974 | United Kingdom | 501/97 |
| 2072220A | 9/1981 | United Kingdom | 501/97 |

*Primary Examiner*—Richard K. Seidel
*Assistant Examiner*—Jeanne M. Elpel
*Attorney, Agent, or Firm*—Sixbey, Friedman, Leedom & Ferguson

[57] ABSTRACT

A welding accessory which includes an arc shield having outer and inner peripheral surfaces such that a weld can be formed within the inner peripheral surface as the arc shield shields the weld form external air during forming of the weld. The arc shield includes a ceramic material having not less than 40 weight % of boron nitride. The arc shield may be formed of a composite of boron nitride and silicon nitride, a composite of boron nitride and alumina nitride, a composite of boron nitride, aluminum and silicon nitride, or a composite of boron nitride and zirconia.

8 Claims, 7 Drawing Sheets

REUSABLE STUD WELDING FERRULE CONTAINING BORON NITRIDE

BACKGROUND OF THE INVENTION

1. Field of the Invention

This invention relates to a welding accessory, particularly to a welding accessory for use during welding to prevent the outflow of molten metal and mold the same into a fixed shape, and to shield the weld portion from external air.

2. Description of the Prior Art

In arc stud welding, a welding accessory called an arc shield (ferrule) has conventionally been used for molding the shape of the molten metal, shielding the weld portion from external air, and other such purposes.

Such arc shields have in the past been made of, for example, ceramic. The conventional ceramic arc shield breaks under the thermal shock (1,300° C. and higher) during welding and cannot be reused. Therefore after welding it is removed from the weld portion by smashing it with a hammer or the like.

Thus the conventional ceramic arc shield entails the problems that it is an expendable item which must be employed one for each stud and cannot be reused and, moreover, that it must be fitted one per stud and then, after welding, be smashed for removal.

In order to overcome these problems, it has been proposed for example in Japanese Unexamined Patent Publication No. 59(1984)-141379 and Japanese Unexamined Utility Model Publication No. 60(1985)-181269 that the arc shield be made reusable a number of times by constituting it from a material with superior thermal shock resistance property and forming it of separable segments.

However, the aforesaid Japanese Unexamined Utility Model Publication No. 60(1985)-181269 merely mentions ceramic as a material with superior thermal shock resistance property and does not disclose any specific material which, having higher thermal shock resistance than the conventional ceramic arc shield, is capable of withstanding numerous weldings (thermal shocks).

Further, while the aforesaid Japanese Unexamined Patent Publication No. 59(1984)-141379 discloses silicon nitride ceramic as a material having superior thermal shock resistance property, experiments conducted by the present inventors show that this silicon nitride ceramic is broken by thermal shock after one or two stud weldings and does not have adequately superior thermal shock resistance property to enable numerous repeated uses.

SUMMARY OF THE INVENTION

The object of the present invention is, in light of the aforesaid circumstances, to provide a welding accessory, such as an arc shield, which is superior in thermal shock resistance property and can be repeatedly used numerous times.

The welding accessory according to the present invention is characterized in that it consists of a ceramic containing not less than 20 weight % of boron nitride.

The aforesaid ceramic containing not less than 20 weight % of boron nitride is superior in thermal shock resistance property to other ceramics and, moreover, thanks to the effect of the boron nitride, adhesion of molten metal thereto is extremely low. Therefore, the welding accessory constituted of this ceramic can be repeatedly used numerous times.

DESCRIPTION OF THE PREFERRED EMBODIMENTS

Embodiments of the invention will hereinafter be explained with reference to the drawings.

Figure 1:
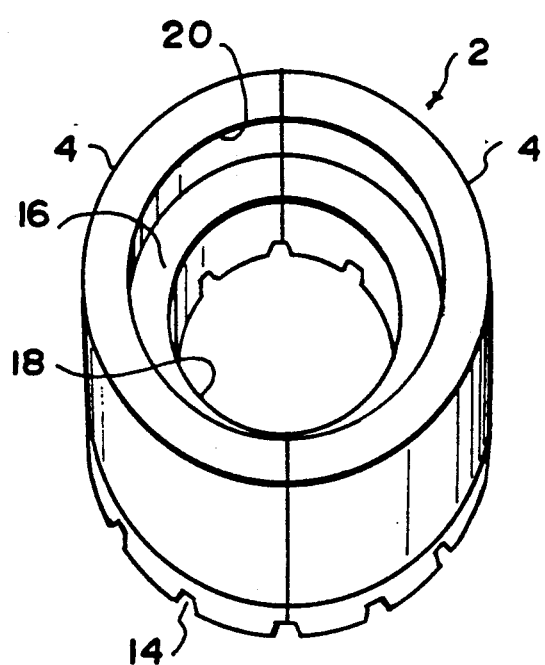
FIGS. 1 to 3 are perspective views showing an arc shield which is an embodiment of the present invention.
Figure 2:
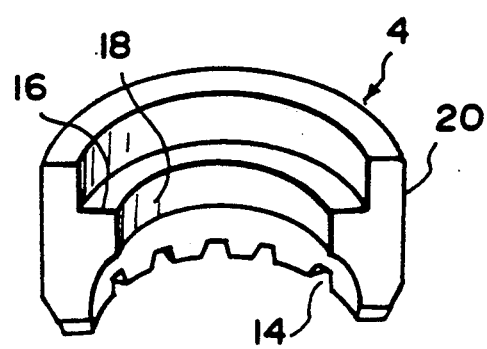
Figure 3:
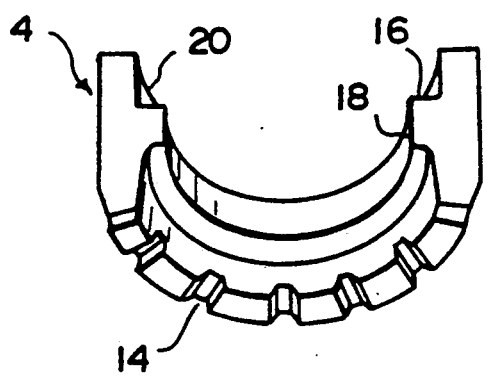

FIG. 1 is a perspective view showing an arc shield which is an embodiment of the present invention. The illustrated arc shield 2 consists of two arc shield segments 4 formed of ceramic containing not less than 20 weight % of boron nitride. It is formed to be generally cylindrical. The two arc shield segments 4 are identical semicylinders. FIG. 2 is a perspective view showing one of the arc shield segments 4 as viewed obliquely from above while FIG. 3 is a perspective view showing the same as viewed obliquely from below.

Figure 4:
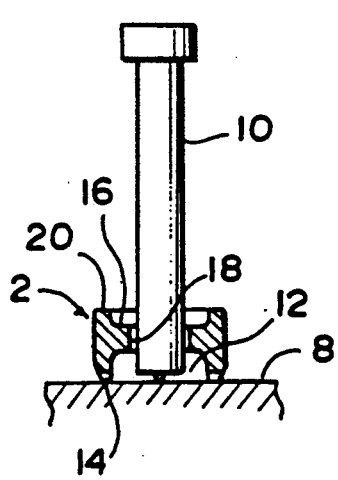
FIG. 4 is a sectional view showing the state of use of the welding accessory shown in FIG. 1.

As shown in FIG. 4, when a stud 10 is to be welded to a base metal 8 (the welded material), the arc shield 2 is fitted around the stud 10 with its lower surface in abutment with the upper surface of the base metal 8 so as to enclose the weld portion (the portion of abutment between the lower surface of the stud 10 and the upper surface of the base metal 8). When welding is conducted with the arc shield 2 disposed in this state, the arc shield 2 performs such functions as shielding the weld portion 12 from external air during the welding operation and molding the molten metal formed at the weld portion 12.

The bottom surface of the arc shield 2 is formed with a plurality of communicating notches 14 of prescribed opening area which provide communicating passages between the interior and exterior of the arc shield 2 at the time of welding. Further, an upper wall 16 of the arc shield 2 is formed with a stud insertion passage 18 which is slightly larger than the outer diameter of the stud 10, while the arc shield 2 is additionally formed with a cylindrical lug 20 to be clamped by a welding machine to be explained below.

Figure 5:
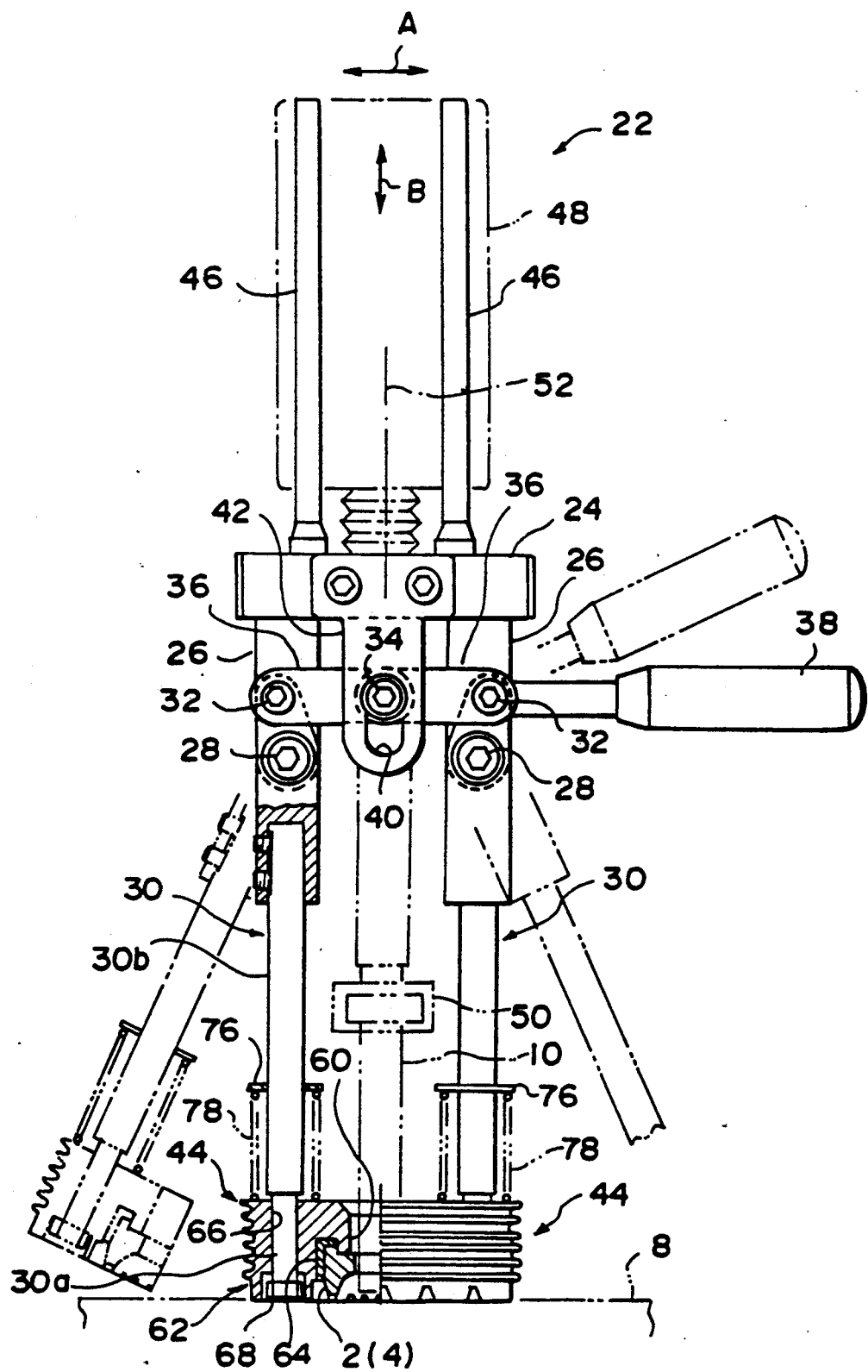
FIG. 5 is a front view of a welding machine using the aforesaid arc shield of FIG. 1.
Figure 6:
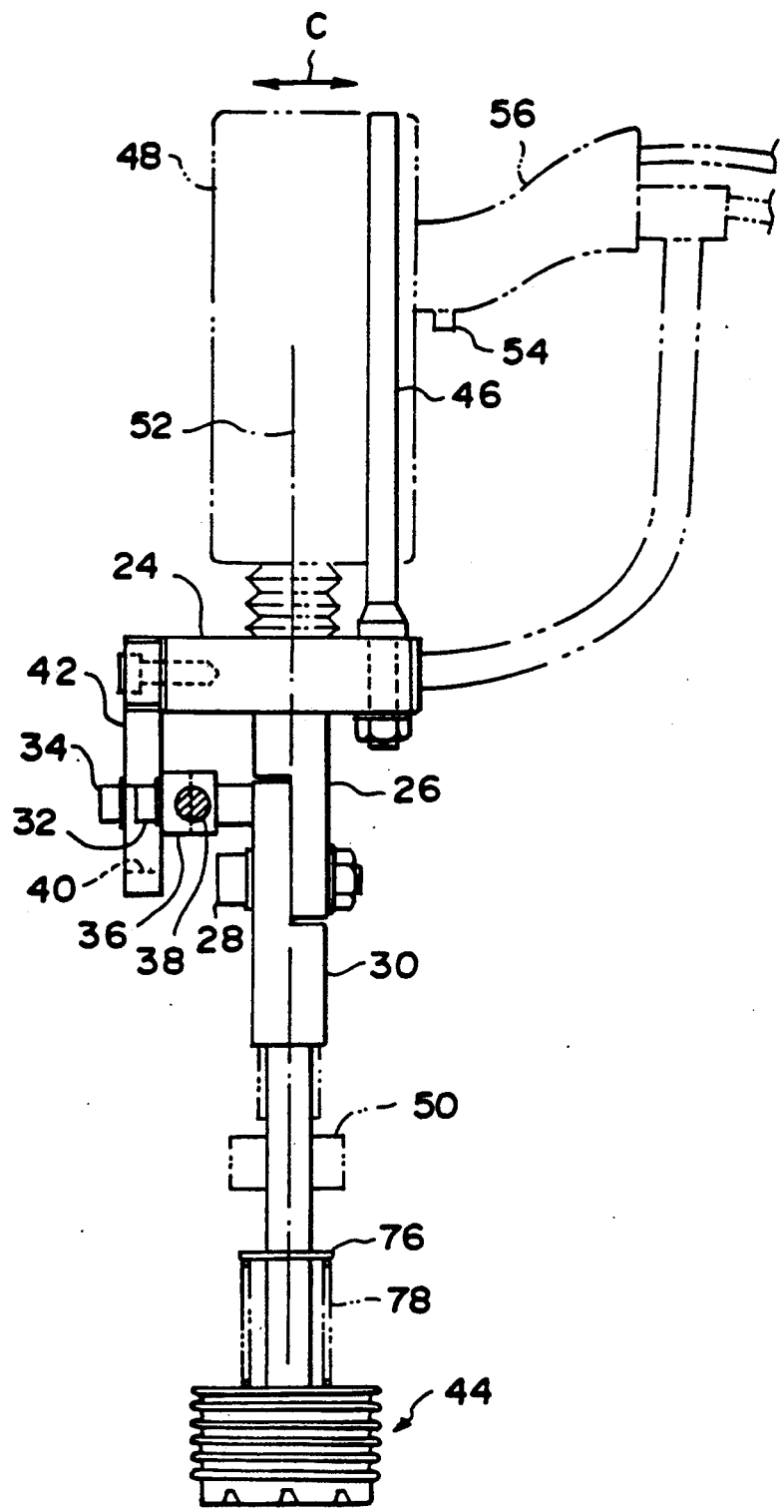
FIG. 6 is a right side view of the welding machine of FIG. 5, FIGS. 7 and 9 are front views showing the lever opening/closing mechanism of the welding machine of FIG. 5.

FIG. 5 is a front view of a welding machine for carrying out stud welding using the aforesaid arc shield 2, and FIG. 6 is a right side view of the welding machine shown in FIG. 5.

The illustrated welding machine 22 comprises a base 24, a pair of levers 30 each rotatably supported via a pivot pin 28 on one of two legs 26 fixed on the base 24, a pair of links 36 each rotatably connected at its one end to the upper end of one of the levers 30 and rotatably connected at its other end to the other member of the pair by a joint pin 34, a handle 38 fixed to said one end of one of the links 36 and extending laterally (in the direction of arrow A in FIG. 5), an oblong-hole member 42 fixed on the base 24 and having an oblong hole 40 extending vertically (in the direction of arrow B in FIG. 5) through which the joint pin 34 connecting the other ends of the links 36 passes, mounts 44 provided on the lower ends of the levers 30, and a welding gun 48 attached by a pair of rods 46 to stand upright on the base 24.

As illustrated by the broken lines in the figure, the levers 30 can be opened and closed by rotating the handle 38 vertically. Further, the lower end of the welding gun 48 is provided with a chuck 50 for retaining the head of the stud 10, and the welding gun 48 is also provided with a grip 56 having a welding switch 54.

The arc shield mounts 44 each retains one of the arc shield segments 4 and is equipped with a mount body 62 having an inner clamp member 60 and with outer clamp members 64. The associated arc shield segment 4 is clamped between the outer clamp members 64 and the inner clamp member 60 by pressing the outer clamp members 64 inward toward the arc shield segment 4.

Each mount body 62 is formed with a through-hole 66 and a small-diameter portion 30a at the end of the associated lever 30 is passed through the through-hole 66 and a nut 68 is screwed onto the lower end of the small-diameter portion 30a, whereby the mount 44 is fixed on the lever 30.

Arc stud welding is carried out with the welding machine 22 as follows. First, the handle 38 is rotated upward from the position indicated by the solid lines in FIG. 5 to the position indicated by the broken lines. This causes the two levers 30 to open and assume the state shown in phantom lines, whereafter the chuck 50 provided at the tip of the welding gun is caused to grip the head of the stud 10. Next, the handle 38 is rotated downward, thereby causing the levers 30 to close to the state shown in solid lines. In this state the arc shield mounts 44 provided on the respective levers 30 come into abutment with each other causing the arc shield segments 4 retained by the respective mounts 44 to abut on one another, thus forming the cylindrical arc shield 2 with the stud 10 enclosed thereby as illustrated in FIG. 4. Next, from this state the welding machine 22 is lowered to cause the lower surface of the stud 10 and the lower surface of the arc shield 2 to abut on the upper surface of the base metal 8 at a prescribed position thereon, whereafter the welding switch 54 on the welding gun grip 56 is pressed to carry out welding. After completion of welding, the handle 38 is rotated downward to open the levers 30. Further arc stud welding can thereafter be repeated in a similar manner.

Figure 7:
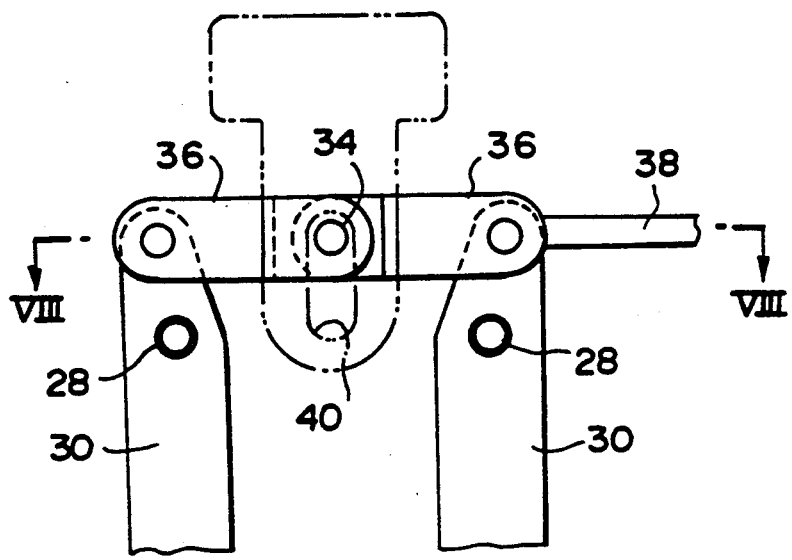
Figure 8:
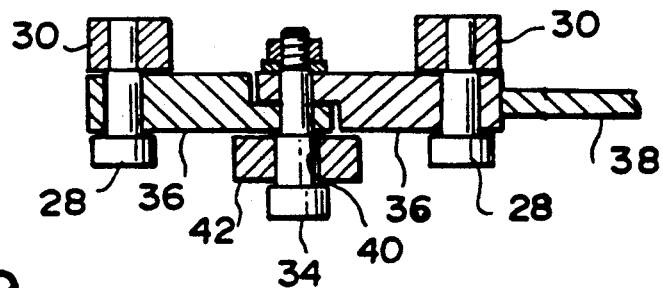
FIG. 8 is a sectional view taken along line VIII—VIII of FIG. 7, FIGS. 10 and 11 are detailed views of the arc shield retaining section of the welding machine of FIG. 5, FIG. 10 being a sectional view taken along line X—X in FIG. 11 and FIG. 11 being a sectional view taken along line XI—XI in FIG. 10, FIGS. 12 to 14 are plan views for explaining changes in the retained state of the arc shield at high temperature.
Figure 9:
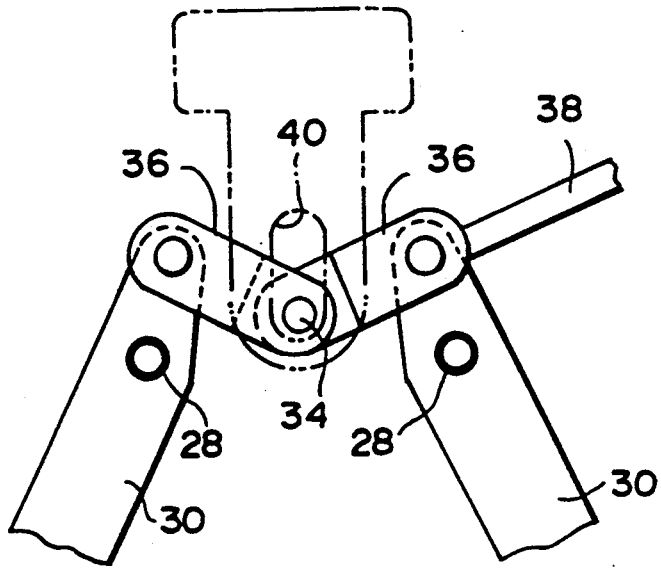

The opening/closing operation of the levers 30 by the handle 38 will now be explained in detail with reference to FIGS. 7-9. When the handle 38 is horizontal as shown in FIG. 7, the levers 30 are closed. Then, as shown in FIG. 9, when the handle 38 is rotated upward from this state, the joint pin 34 which rotatably connects the inward ends of the two links 36 moves downward along the oblong hole 40, causing the links 36 to incline as illustrated and the levers 30 to rotate about the pivot pins 28 such that their lower ends spread and assume the open state. Then if the handle 38 is rotated downward from the state shown in FIG. 9, the levers 30 return to their closed state as illustrated in FIG. 7. FIG. 8 is a sectional view taken along line VIII—VIII in FIG. 7.

As in the welding machine 22 described above the levers 30 (arc shield segments 4) can be opened and closed by rotating the handle 38, the opening/closing operation can be carried out with extreme ease and as desired.

Moreover, since the aforesaid welding machine 22 is constituted such that opening/closing of the levers 30 (arc shield segments 4) is conducted within a vertical plane including the stud 10, a large number of studs can be welded without any problem of interference or the like from other studs such as would be apt to arise should the welding machine 22 be constituted such that the opening/closing of the levers 30 is conducted in, for example, a plane perpendicular to the stud 10 (in a plane parallel to the surface of the base metal 8).

Further, the handle 38 functions not only as a means for opening and closing the levers 30 but also in cooperation with the grip 56 of the welding gun as a handle for stabilizing the welding posture. More precisely, while the grip 56 provided on the welding gun 48 extends laterally rearward from the rear surface of the welding gun 48 (in the direction of arrow C in FIG. 6), the handle 38 makes an angle of 90° relative to the grip 56 and, moreover, is disposed at a lower position. Since the handle 38 is provided perpendicular to the grip 56 of the welding machine and at a lower position than the grip 56, during welding the operator can grasp the grip 56 of the welding machine with his right hand while keeping his right index finger on the welding switch 54 and can maintain the welding machine 22 in good balance by gripping the handle 38 with his left hand. This makes it easier for the operator to maintain a stable welding posture and thus increases operational efficiency and reduces the likelihood of faulty welds.

The chuck 50 serves to hold the stud 10 aligned coaxially with the axis 52 of the welding gun 48 and the stud 10 gripped by the chuck 50 is positioned in a common plane with the two levers 30 fixed on the arc shield mounts 44. In other words, the levers 30 and the welding gun 48 are disposed such that the center axis of the stud 10 and the center axes of the two levers 30 fall within one and the same plane (extending laterally and vertically). As a result of this arrangement, the arc shield 2 makes reliable and uniform abutment with the upper surface of the base metal, enabling stable welding and improving the weld reliability.

Furthermore, in the aforesaid welding machine 22, the arc shield 2 and the mounts 44 are each divided into two segments and attached to the lower ends of the levers 30 which can be spread widely at the time of inserting the stud 10 into the chuck 50 so as to secure a large working space in the vicinity of the chuck 50. the stud 10 can thus be inserted into the chuck 50 with ease.

Still further, as will be explained later, one of the arc shield mounts 44 is provided on its contact surface with a guide pin 80 and the other is provided on its contact surface with a guide hole 82. Thus proper abutment between the arc shield mounts 44 and between the arc shield segments 4 can be ensured when the levers 30 are closed.

A detailed explanation will now be given with reference to FIGS. 10 and 11 regarding the retention of the arc shield segments 4 by the arc shield mounts 44.

Figure 10:
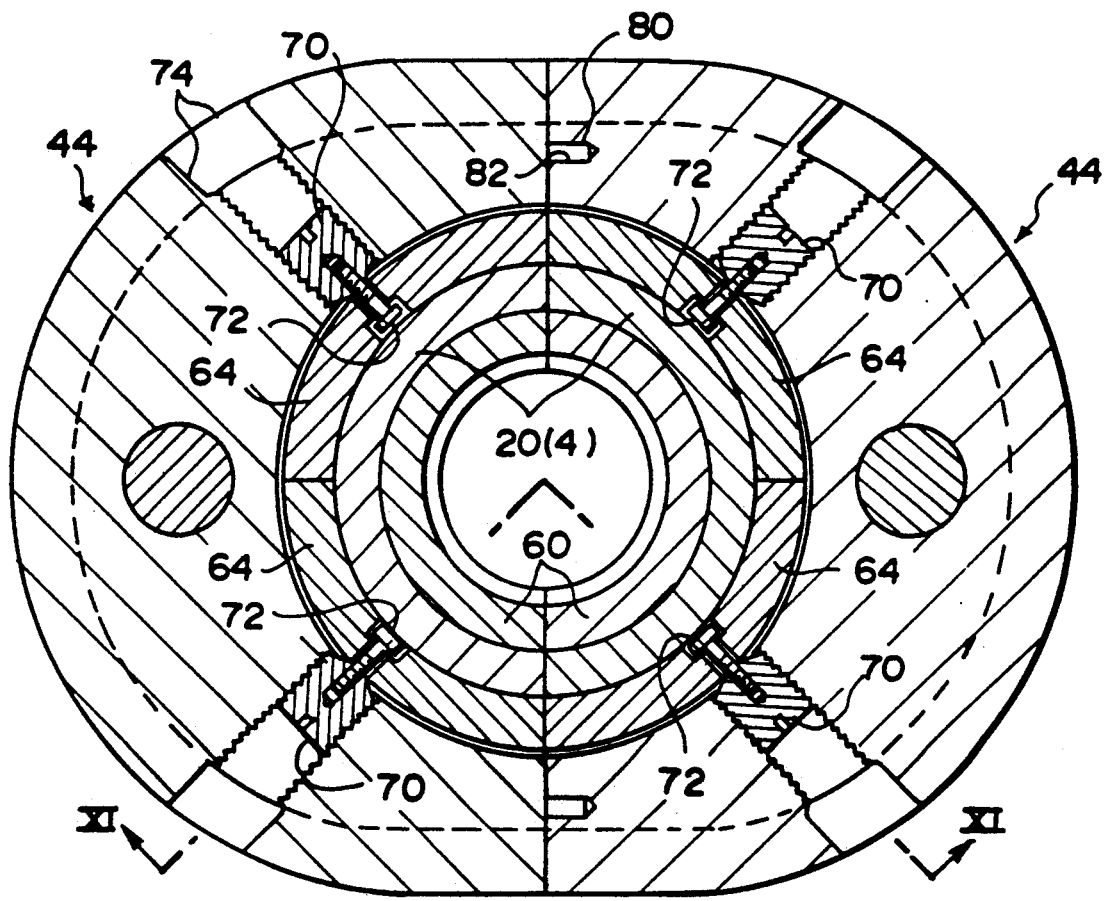
Figure 11:
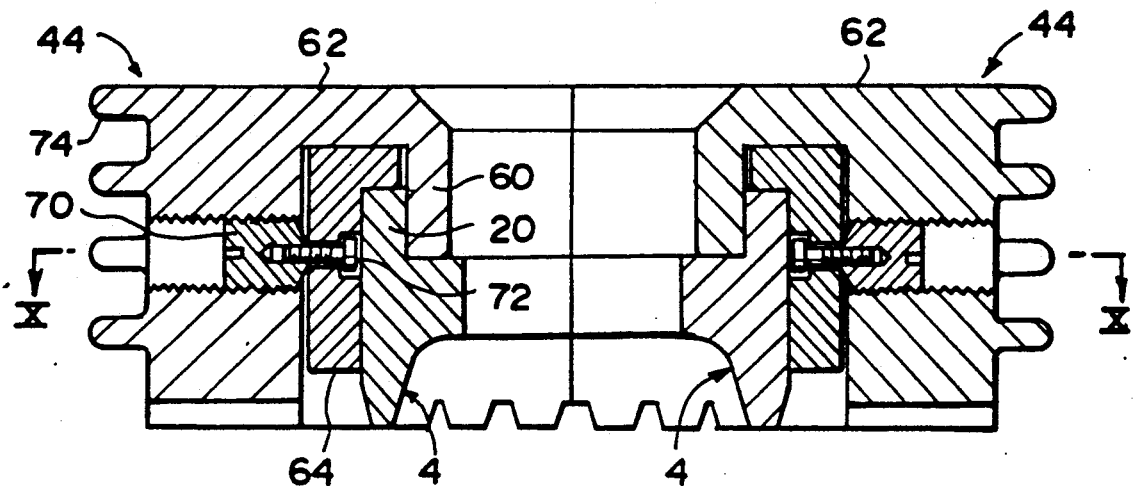

FIG. 10 is a sectional view taken along line X—X in FIG. 11 and FIG. 11 is a sectional view taken along line XI—XI in FIG. 10, and both figures illustrate the state in which the levers 30 are closed to bring the pair of arc shield segments 4 into abutment and thus to form the cylindrical arc shield 2.

As illustrated, each mount body 62 is formed with a semicylindrical inner clamp member 60 which abuts on the inner surface of a semicylindrical lug 20 of the associated arc shield segment 4. The inner surface of the lug 20 of the arc shield segment 4 abuts on the outer surface of the inner clamp member 60 so as to attach the arc shield segment 4 to the mount body 62. Outwardly of each of the lugs 20 are provided two outer clamp members 64 each shaped as a quarter cylinder (of 90° arcuate section). Each outer clamp member 64 is pressed toward the center (i.e. toward the center of the cylindrical arc shield 2 formed when the arc shield segments 4 are brought into abutment) by a pressure screw 70 threadedly engaged with the associated mount body 62 and serving as a pressure member, whereby the arc shield segments 4 are clamped between the inner and outer clamp members 60, 64.

So as to cause the pressure of the pressure screw 70 on the outer clamp member 64 to act toward the aforesaid center at the middle of the outer clamp member 64 (at the middle of the 90° arcuate section), the arrangement is such that the tip of the pressure screw 70 contacts the middle of the outer clamp member 64 and the axis thereof is directed toward the aforesaid center.

By the arrangement in which the cylindrical arc shield 2 is divided into two arc shield segments 4 each of which is retained by being clamped between a semicylindrical inner clamp member 60 and two quarter cylinder outer clamp members 64 in the manner described above and each outer clamp member 64 is pressed toward the aforesaid center at its middle portion, it is possible to prevent cracking or the like of the arc shield segments 4 which might otherwise occur during welding because of the difference in coefficient of thermal expansion among the arc shield segments 4 on the one hand and the mount body 62 and the outer clamp member 64 on the other.

Figure 12:
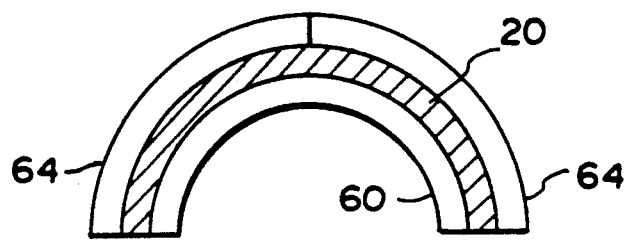
Figure 13:
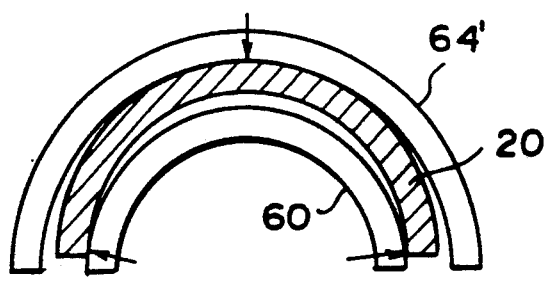

This will be explained. Prior to welding, the inner and outer clamp member 60, 64 and the lug 20 of the associated arc shield segment 4 are in contact throughout as illustrated in the plan view of FIG. 12. Welding is carried out in this state, resulting in thermal expansion of the members 60, 20 and 64 as the temperature of these members becomes high. While as mentioned earlier the arc shield segments 4 are made from ceramic, the inner and outer clamp member 60, 64 are made from a metal with a high thermal conductivity so as to increase their heat dissipation property. Thus the arc shield segments undergo almost no thermal expansion while the clamp members expand considerably. Therefore, if the outer clamp members 64 should be made semicylindrical in shape and the center peripheral portion thereof should be pressed toward the center, then as shown in FIG. 13 only the center portion of the lug 20 of the arc shield segment 4 would make contact with the outer clamp member 64' and receive an inwardly directed force, while only the end portions thereof would make contact with the inner clamp member 60 and receive an outwardly directed force therefrom. As can be easily understood from FIG. 13, a very large thermal stress (bending moment) would therefore act on the arc shield segment 4, making it vulnerable to cracking and breakage.

Figure 14:
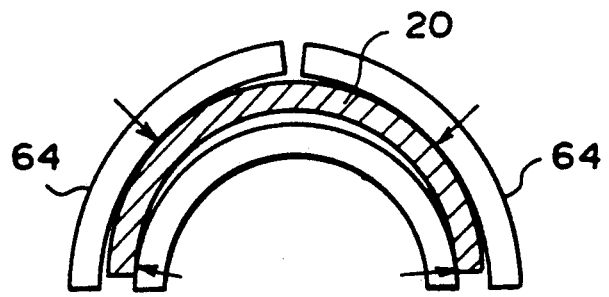

In contrast, in the welding machine according to this invention described above, each outer clamp member 64' is divided into two quarter cylinder outer clamp members 64 and each quarter cylinder clamp member 64 is pressed toward the center at its middle portion. As a result, the forces arising because of thermal expansion act as shown in FIG. 14. As can be easily understood from this figure, the thermal stress (bending moment) acting on each arc shield segment 4 is much smaller than that in the case of FIG. 13. Thus the danger of the arc shield segments 4 being cracked or broken as a result of the difference in coefficient of thermal expansion is markedly reduced.

A locknut 72 is engaged with each pressure screw 70. The locknut 72 passes through and fixes the associated outer clamp member 64. As a result, detachment of the outer clamp member 64 from the mount body 62 at the time the pressure of the pressure screw 70 on the outer clamp member 64 is relieved can be prevented.

Moreover, a prescribed gap is present around the locknut 72 so that the outer clamp member 64 is loosely secured. Due to this fact and the fact that the head of the pressure screw 70 (i.e. the portion thereof pressing onto the outer clamp member 64) is made generally conical in shape, the positional freedom of the outer clamp member 64 with respect to the pressure screw 70 is enhanced, whereby the amount of force acting on the arc shield segment 4 during the aforesaid thermal expansion is reduced.

To further reduce the amount of force acting on the arc shield segments 4 during thermal expansion, it is also possible, for example, to constitute the leading pressure portion of the pressure screw 70 as a spring or other cushioning mechanism (not shown) so as to enable positional variation in the aforesaid center direction.

Further, the arc shield mounts 44 (constituted of the mount bodies 62 and the outer clamp members 64) are, as explained earlier, fabricated from copper or a copper alloy to have a high thermal conductivity and the outer periphery of the arc shield mounts 44 is further provided with radiator fins 74 which are integral with the mount body 62. As a result, the high-temperature heat generated during welding does not accumulate in the ceramic arc shield but is efficiently dissipated into the air, whereby the arc shield is protected from high-temperature deterioration and its service life is extended.

In addition, each arc shield mount 44 is, by its mount body 62, attached between a shoulder portion of the associated lever 30 (the shoulder between the small-diameter portion 30a and a large-diameter portion 30b) and the nut 68 so as to be slidable along the prescribed length of the small-diameter portion 30a. Further, the large-diameter portion 30b has a spring seat 76 fixed thereon and a compression spring 78 is provided between the spring seat 76 and the upper surface of the mount body 62. As a result, there is constituted a cushioning mechanism with respect to the arc shield 2, which cushioning mechanism enables the ceramic arc shield 2 to press onto the base metal 8 at the time of welding in a stable manner without exertion of undue force thereon. This is significant because prior to welding the lower ends of the levers 30 are, as shown in FIG. 5, positioned above the lower end of the arc shield 2, while during welding the lower ends of the levers 30 abut against the upper surface of the base metal 8 after the welding machine 22 has been pushed down toward the base metal 8. In other words, the arrangement is such that all of the downward pressure exerted by the operator for ensuring that the welding machine does not move during welding is transferred to the base metal 8 via the two levers 30, whereby the arc shield 2 is always pressed onto the base metal 8 by the constant and appropriate force of the compression spring 78.

Also, the entire periphery of the arc shield 2 is covered by the arc shield mounts 44, whereby the arc shield 2 is protected from damage and breakage by direct contact with surrounding materials or instruments.

The nature of the material of the arc shield 2 will now be explained.

As explained earlier, the arc shield 2 is constituted of ceramic containing not less than 20 weight boron nitride. As a result of being constituted of this material, the arc shield 2 is able to withstand the thermal shock (1,300° C. and higher) arising during welding and is also free from adhesion of the molten metal thereto. It can thus be used repeatedly a large number of times.

Arc shields of the type shown in FIG. 1 were fabricated using the various ceramics listed in Table 1 below and each of the so fabricated arc shields was repeatedly tested in arc stud welding using the welding machine shown in FIG. 6. The table shows the number of times each arc shield could be used and whether or not the quality of the welds was satisfactory as judged according to a JIS test (JIS B1198 Headed Stud).

TABLE 1

Number of welding repetitions possible and weld quality using various arc shields

| | Ceramic material of arc shield (chemical formula) | Number of welding repetitions possible | JIS test |
|---|---|---|---|
| Prior art 1 | Alumina silicate compound ($Na_2O$—$Al_2O_3$—$SiO_2$ System) | 1 | Pass |
| Invention 1 | Boron nitride (BN) | 100 or more | Pass |
| Invention 2 | Composite of boron nitride and silicon nitride (BN—$Si_3N_4$) | 100 or more | Pass |
| Invention 3 | Composite of boron nitride and aluminum nitride (BN—AlN) | 100 or more | Pass |
| Invention 4 | Composite of boron nitride, alumina and silicon nitride (BN—$Al_2O_3$—$Si_3N_4$) | 100 or more | Pass |
| Invention 5 | Composite of boron nitride and zirconia (BN—$ZrO_2$) | 100 or more | Pass |
| Comparative example 1 | Silicon nitride ($Si_3N_4$) | 1-2 | Fail |
| Comparative example 2 | Carborundum (SiC) | 1 | Fail |
| Comparative example 3 | Composite of silicon nitride and carborundum ($Si_3N_4$—SiC) | 1-2 | Fail |
| Comparative example 4 | Alumina ($Al_2O_3$) | 1 | Fail |
| Comparative example 5 | Magnesia toughened zirconia (MgO—$ZrO_2$) | 20-30 | Fail |
| Comparative example 6 | Mullite ($3Al_2O_3$—$2SiO_2$) | 4-5 | Fail |

The ceramics containing boron nitride of the invention examples 1 to 5 appearing in Table 1 were each prepared according to the hot press method by high-temperature sintering for 40 min. at a pressure of 230 Kg/cm² and a temperature of 1,580° C.

The welding was conducted at a welding current of 1,200-1,300 A and an arc time of 0.8 sec. All materials used were of not less than 99% purity. In the JIS test, in the case of the arc shields that were used 100 times or more, the required number of weld pieces were subjected to testing from the 100th time on. In other cases, the testing was conducted in accordance with JIS B1198 in the ordinary manner.

As is clear from Table 1, all the welds made using arc shields made of ceramics containing boron nitride passed the JIS test and the arc shields could be used repeatedly for not less than 100 weldings. They were thus markedly superior to the prior art ceramics in thermal shock resistance and the ceramics of the comparative examples and there can be noted a great increase in the number of repeated weldings possible.

Next a similar test was carried out using various boron nitride ceramics containing differing amounts of boron nitride and the effect of the boron nitride content was examined. The results are shown in Table 2 below.

TABLE 2

Results of test on quality of stud welds made using arc shields made from various boron nitride system ceramics

| | Arc shield composition (in weight % TR = trace) | | | | | | | Weld test (Current: 1,200-1,300 A; Arc time: 0.8 sec) | |
|---|---|---|---|---|---|---|---|---|---|
| Arc shield | BN | AlN | $Si_3N_4$ | $Al_2O_3$ | $ZrO_2$ | CaO | $B_2O_3$ | Number of welding repetitions possible | JIS test |
| A | 99 | — | — | — | — | 0.5 | 0.5 | 100 or more | Pass |
| B | 96 | — | — | — | — | 1.5 | 2.5 | 100 or more | Pass |
| C | 80 | 20 | — | TR | — | TR | TR | 100 or more | Pass |
| D | 50 | 50 | — | TR | — | TR | TR | 100 or more | Pass |
| E | 80 | — | 20 | — | — | TR | TR | 100 or more | Pass |
| F | 50 | — | 50 | — | — | TR | TR | 100 or more | Pass |
| G | 40 | — | 40 | 20 | — | TR | TR | 80-120 | Pass |
| H | 60 | — | — | — | 40 | TR | TR | 100 or more | Pass |
| I | 35 | — | 65 | — | — | TR | TR | 50-60 | Pass |
| J | 32 | — | 65 | 3 | — | TR | TR | 20-25 | Pass |
| K | 28 | 2 | 65 | 5 | — | TR | TR | 18-22 | Pass |
| L | 20 | — | 65 | 15 | — | TR | TR | 10-12 | Pass |
| M | 20 | 15 | 65 | TR | — | TR | TR | 10-12 | Pass |

TABLE 2-continued

Results of test on quality of stud welds made using arc shields made from various boron nitride system ceramics

| Arc shield | Arc shield composition (in weight % TR = trace) | | | | | | | Weld test (Current: 1,200–1,300 A; Arc time: 0.8 sec) | |
|---|---|---|---|---|---|---|---|---|---|
| | BN | AlN | $Si_3N_4$ | $Al_2O_3$ | $ZrO_2$ | CaO | $B_2O_3$ | Number of welding repetitions possible | JIS test |
| N | 12 | — | 88 | — | — | TR | TR | 1 | Fail |
| O | 12 | 8 | 80 | TR | — | TR | TR | 1 | Fail |
| P | 8 | 12 | 80 | TR | — | TR | TR | 1 | Fail |

Among the ceramics listed in Table 2, those with a high content of boron nitride were sintered at temperatures up to 1,500° C.

As is obvious from Table 2, the arc shields with higher boron nitride content could be used in a greater number of weldings and also led to better welds as judged by the JIS test. In particular, where the boron nitride content was 20 weight % or higher the welds passed the JIS test and the arc shields could be used for ten or more welds. It was thus confirmed that the ceramics with a boron nitride content of 20 weight % or greater constitute materials with excellent thermal shock resistance property and can be used repeatedly for welding. More practically, it is considered that the ceramics capable of being used for 100 or more weldings, namely those which contain 40 weight % or more boron nitride, are preferable for use.

For determining the most appropriate welding conditions, arc shields fabricated from ceramics having a boron nitride content of 40 weight % or more (the arc shields B, E, F and G in Table 2) were used and the resulting welds were tested according to the same JIS test referred to above and also according to a JASS test (Stud Welding Quality Test, JASS 6, Steel Structure Work, Supplement 5). The results are shown in Table 3.

From Table 3 it is found that in the case of using an arc shield made from a ceramic containing 40 weight % or more of boron nitride, there exists a range of appropriate welding conditions which is as broad as or broader than that where a conventional arc shield is used.

As is clear from the various foregoing experiments, an arc shield made from a ceramic containing 20 weight % or more of boron nitride possesses thermal shock resistance property which is substantially superior to that of conventional arc shields made from other ceramics and can be repeatedly used for welding a large number of times. As a result, if such an arc shield is used in combination with a welding machine of the aforesaid type, it becomes possible to eliminate all of the shortcomings of the conventional ceramic arc shield, namely that the arc shield can be used only once, that it is therefore necessary to use a number of arc shields equal to the number of studs, that each stud has to have an arc shield fitted thereon before welding, and that it is necessary to conduct the troublesome work of smashing the arc shield after the welding.

The aforesaid arc shield is not the only welding accessory made of ceramic containing not less than 20 weight % boron nitride according to this invention. It is also possible to realize various other types of welding

TABLE 3

Results of test on quality of stud welds made using arc shields made from various boron nitride system ceramics

| Arc shield | Welding current | Arc time (sec.) | Number of welding repetitions possible | JIS test | JASS test |
|---|---|---|---|---|---|
| B | 1000 A | 0.8 | 100 or more | Pass | Fail |
| B | 1000 A | 1.0 | 100 or more | Pass | Pass |
| B | 1000 A | 1.2 | 100 or more | Pass | Pass |
| B | 1200 A | 0.6 | 100 or more | Pass | Fail |
| B | 1200 A | 0.8 | 100 or more | Pass | Pass |
| B | 1200 A | 1.0 | 100 or more | Pass | Pass |
| B | 1400 A | 0.2 | 100 or more | Fail | Fail |
| B | 1400 A | 0.3 | 100 or more | Pass | Fail |
| B | 1400 A | 0.4 | 100 or more | Pass | Pass |
| B | 1400 A | 1.0 | 100 or more | Pass | Pass |
| B | 1400 A | 1.2 | 100 or more | Pass | Fail |
| B | 1600 A | 0.3 | 100 or more | Pass | Pass |
| B | 1600 A | 0.8 | 100 or more | Pass | Pass |
| B | 1800 A | 0.3 | 100 or more | Pass | Pass |
| B | 1800 A | 0.8 | 100 or more | Pass | Pass |
| E | 1000 A | 1.0 | 100 or more | Pass | Pass |
| E | 1200 A | 0.8 | 100 or more | Pass | Pass |
| E | 1200 A | 1.0 | 100 or more | Pass | Pass |
| E | 1400 A | 0.3 | 100 or more | Pass | Fail |
| E | 1400 A | 0.4 | 100 or more | Pass | Pass |
| E | 1600 A | 0.3 | 100 or more | Pass | Pass |
| F | 1200 A | 0.8 | 100 or more | Pass | Pass |
| F | 1400 A | 0.3 | 100 or more | Pass | Fail |
| F | 1400 A | 0.4 | 100 or more | Pass | Pass |
| G | 1200 A | 0.8 | 100 or more | Pass | Pass |

In the JIS and JASS tests, the required number of weld pieces were subjected to testing from the 100th time on.

accessories such as a tab for splice arc welding of plates or a strap for splice arc welding of steel rods.

Figure 15:
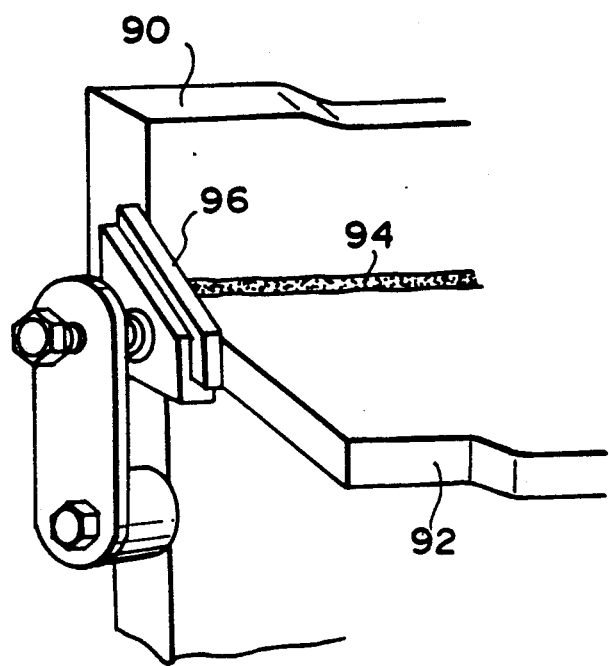
FIG. 15 is a perspective view of another embodiment of the invention.

FIG. 15 is a perspective view of splice arc welding of two plates using a tab of the aforesaid type to which the present invention has been applied. The plates 90, 92 are arc welded at a weld portion 94 and a tab 96 constituted of a ceramic containing not less than 20 weight % boron nitride is disposed at either end of the weld portion 94. The tabs 96 can be attached either by use of a strong permanent magnetic, such as a rare earth system permanent magnet, or by screws or other mechanical means.

A tab of the aforesaid type fabricated from a ceramic containing not less than 20 weight % boron nitride exhibits excellent thermal resistance property and enables the same tab to be repeatedly used for welding numerous times and thus provides improved economy and operational efficiency over a conventional metallic or ceramic tab usable only once.

Figure 16:
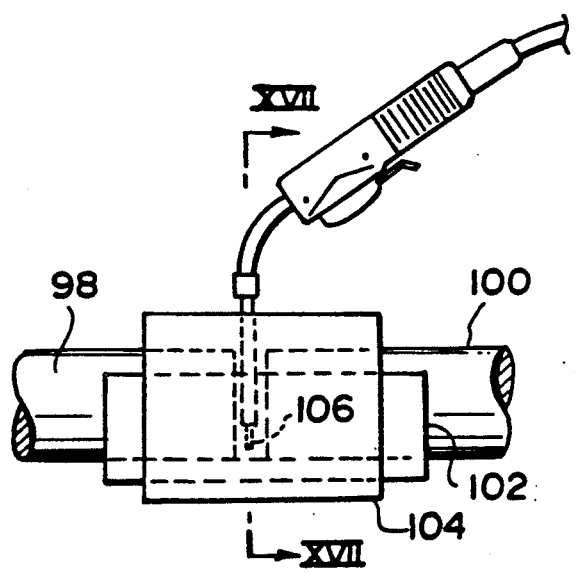
FIG. 16 is a front view of still another embodiment of the invention.
Figure 17:
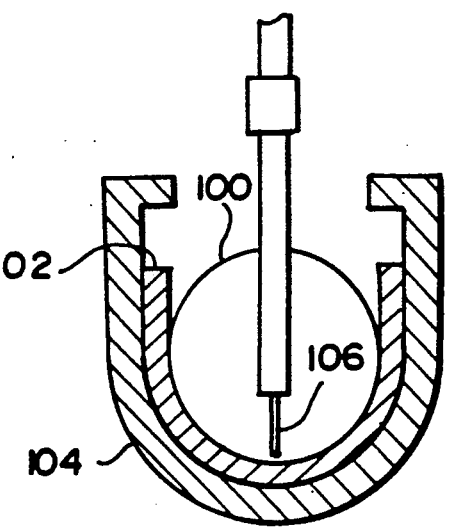
FIG. 17 is a sectional view taken along line XVII—XVII of FIG. 16.

FIG. 17 is a front view of splice welding (enclosed welding) of two steel rods using a strap of the aforesaid type to which the present invention has been applied, and FIG. 17 is a sectional view taken along line XVII—XVII in FIG. 16. The ends of rods 98 and 100 are disposed facing each other and a U-shaped strap 102 fabricated from a ceramic containing not less than 20 weight % boron nitride is disposed at the opposing end portions. A metallic reinforcement jig 104 is disposed on the exterior of the strap 102 and in this state the ends of the rods are welded together by gas welding using a welding rod 106.

Thanks to the effect of the boron nitride a strap of the aforesaid type fabricated from a ceramic containing not less than 20 weight % boron nitride exhibits extremely low adhesive property with respect to metal and can thus be removed with ease upon completion of welding. It thus provides improved economy and operational efficiency.

We claim:

1. A welding accessory comprising:
   an arc shield having exposed outer and inner peripheral surfaces defined by an annular body such that a weld can be formed within the inner peripheral surface as the arc shield shields the weld from external air during forming of the weld and having an end surface for supporting the arc shield on a workpiece, the annular body of said arc shield being formed of ceramic material, the composition of said ceramic material comprising not less than 40 weight % of boron nitride.

2. The welding accessory of claim 1, wherein the annular body of the arc shield includes plural separable segments which together form the inner and outer peripheral surfaces.

3. The welding accessory of claim 1, wherein the arc shield has a substantially cylindrical configuration with a plurality of notches at one end thereof, said arc shield further including a stud insertion passage and a lug, said lug allowing said shield to be clamped to a welding machine, wherein said lug is located at an end of said arc shield opposite the end having the plurality of notches.

4. A welding accessory comprising:
   an arc shield having outer an inner peripheral surfaces such that a weld can be formed within the inner peripheral surface as the arc shield shields the weld from external air during forming of the weld, said arc shield including a ceramic material having not less than 40 weight % of boron nitride;
   wherein the arc shield includes two separable segments which together form the inner and outer peripheral surfaces; and
   wherein the two separable segments are identical in shape having semicylindrical outer surfaces.

5. A welding accessory comprising:
   an arc shield having outer an inner peripheral surfaces such that a weld can be formed within the inner peripheral surface as the arc shield shields the weld from external air during forming of the weld, said arc shield including a ceramic material having not less than 40 weight % of boron nitride; and
   wherein the arc shield is formed of a composite of boron nitride and silicon nitride.

6. A welding accessory comprising:
   an arc shield having outer and inner peripheral surfaces such that a weld can be formed within the inner peripheral surface as the arc shield shields the weld from external air during forming of the weld, said arc shield including a ceramic material having not less than 40 weight % of boron nitride; and
   wherein said arc shield is formed of a composite of boron nitride and aluminum nitride.

7. A welding accessory comprising:
   an arc shield having outer and inner peripheral surfaces such that a weld can be formed within the inner peripheral surface as the arc shield shields the weld from external air during forming of the weld, said arc shield including a ceramic material having not less than 40 weight % of boron nitride; and
   wherein the arc shield is formed of a composite of boron nitride, alumina and silicon nitride.

8. A welding accessory comprising:
   an arc shield having outer and inner peripheral surfaces such that a weld can be formed within the inner peripheral surface as the arc shield shields the weld from external air during forming of the weld, said arc shield including a ceramic material having not less than 40 weight % of boron nitride; and
   wherein said arc shield is formed of a composite of boron nitride and zirconia.

* * * * *